Patented Jan. 12, 1937

2,067,465

UNITED STATES PATENT OFFICE 2,067,465

SYNTHETIC PLASTICS

William P. ter Horst, Silver Lake, Ohio, assignor to Wingfoot Corporation, Akron, Ohio, a corporation of Delaware No Drawing. Application October 14, 1933, Serial No. 693,678

13 Claims. (Cl. 106—23)

This invention relates to synthetic organic plastics and to the method of preparing them. It extends not only to the compositions themselves, but also to the various applications thereof such, for example, as their use in the coating and impregnating of other materials. The compositions of this invention, being plastic in nature, also find use as substitutes for rubber.

It has been known that poly sulphides and ethylene dichloride may be reacted to give plastic materials. The reaction product of dichlorhydrin and sodium sulphide is also known to be a plastic material. These compositions are open to the serious objection, among other things, that they give off very disagreeable odors when heated or otherwise processed at the usual rubber processing temperatures. They are also very brittle at low temperatures, which prevents their use in many commercial products. Again, some of them are easily dissolved by petroleum hydrocarbon solvents.

This invention resides in the discovery that by reacting a poly sulphide with a di(halogenated alkyl) compound of a non-metallic element of group VI of Mendelejeff's periodic system, a plastic composition having excellent properties is obtained. The plastics obtained by practicing the process of this invention are for the most part practically odorless and are very resistant to solvents such as gasoline and oils. This latter property makes their use particularly desirable in articles which are subject to the action of solvents. They are not brittle at temperatures down to −10 degrees C., a property which makes them valuable for use in articles which are to be subjected to relatively low temperatures. Further, they may be mixed with various other plastic compositions and used either as such or as rubber substitutes in rubber compositions.

Of the poly sulphides, the ammonium poly sulphides have been found preferable because of the fact that they apparently give a plastic which is somewhat less brittle than the other poly-sulphides. It is, of course, to be understood that soluble poly-sulphides in general may be employed. Examples are those of the alkali metals, such as sodium and potassium, and of the alkaline earth metals, such as calcium and barium. For convenience, the poly sulphides to which the invention relates will be referred to herein as "alkaline poly sulphides".

The poly sulphides employed in the practice of the invention may be conveniently prepared by known methods, their preparation forming no part of the present invention. When preparing an ammonium poly sulphide, for instance, one procedure is to add 11,385 grams of sulphur and 5,085 grams of water to 22,432 grams of an approximately 36% aqueous solution of $(NH_4)_2S$. The resulting solution is an approximately 50% aqueous solution of an ammonium poly sulphide believed to be principally ammonium tetra sulphide, $(NH_4)_2S_4$. By varying the proportions of sulphur and $(NH_4)_2S$, other poly sulphides may be similarly prepared.

Other alkaline polysulphides which may be employed are sodium tetra sulphide, $Na_2S_4$; potassium tetra sulphide; calcium tetra- and penta-sulphides; potassium hepta sulphide; ammonium penta- and hexa-sulphides; barium tetra sulphide; sodium penta sulphide; potassium penta sulphide, and the like. The nature of the synthetic plastic product will, of course, vary somewhat with the amount of sulphur employed in the poly sulphide. With the lower poly sulphides, softer products are obtained, while with the higher poly sulphides the products are much harder and stiffer.

The di(halogenated alkyl) compounds are preferably in the form of the sulphide, oxide, selenide or telluride. Of the halogens, chlorine is preferred in the practice of the invention, although bromine and iodine may be employed. It has also been found that the lower carbon atom dialkyl compounds generally give better plastics, but it is to be understood that others may be employed. If the alkyl groups contain more than one carbon atom each, it is preferable that the chlorine atoms or other halogen atoms be attached to those carbon atoms which are farthest from the sulphur, oxygen, selenium or tellurium part of the compound, as the case may be. It is also generally preferable that a symmetrical di(halogenated alkyl) compound be employed. Thus, if a di(chloro ethyl) sulphide is employed, the symmetrical di beta chloro compound will usually be found to give the best results.

The invention will be illustrated by the following examples, but it is to be understood that it is not intended to be limited thereby.

Example 1

To 18,420 grams of an approximately 50% aqueous solution of ammonium tetra sulphide are added slowly over a period of approximately six hours 5,404 grams of symmetrical di(chloro methyl) sulphide and 2,600 grams of latex containing approximately 19% of rubber hydrocarbon, the mixture being meanwhile agitated and the temperature being kept below 40 degrees C. After all the materials are added, the agitation is continued for a period of approximately 10 hours. A yellow plastic forms. This plastic is removed and is washed twice with a weak aqueous solution of sodium hydroxide, after which it is subjected to live steam until a temperature of 90 degrees C. is reached. It is then washed three times with approximately 10 gallons of boiling water on corrugated mill rollers and is dried for a period of 12 hours in a vacuum drier. A yield of 5,724 grams of plastic material is obtained of which approximately 494 grams, 8.7%, are rubber. It has been suggested that the equation representing the reaction is as follows:

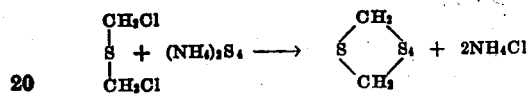

It is not certain that the product has the formula indicated and it is at least possible that it has the formula $(S-CH_2-S_4-CH_2)_n$ where $n$ is a number greater than 1.

*Example 2*

To approximately 5,400 grams of an aqueous 50% solution of ammonium tetra sulphide are added 1,300 grams of symmetrical di(chloro methyl) sulphide, the addition being accomplished slowly over a period of approximately 8 hours at a temperature of 25–30 degrees C. and the mixture being meanwhile agitated. A plastic forms, which, after being washed with 2% aqueous sodium hydroxide solution, heated to 90 degrees C., washed with boiling water and vacuum dried for 26 hours at 90 degrees C., is obtained in a yield of 1,540 grams.

*Example 3*

To 1,500 grams of an aqueous 50% solution of ammonium tetra sulphide are added 300 grams of symmetrical di(beta chloro ethyl) ether. The mixture is agitated for approximately 36 hours, a yellow plastic being formed. The temperature is then raised to 60 degrees C. and the plastic washed with one liter of 3% boiling aqueous sodium hydroxide solution. It is then washed with water and vacuum dried, after which approximately 450 grams of plastic are obtained. The equation representing the reaction is believed to be as follows:

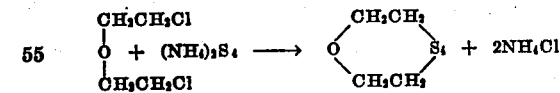

It will be understood that the product may have the formula $(O-CH_2CH_2-S_4-CH_2CH_2)_n$.

*Example 4*

To 1,250 grams of an aqueous approximately 50% solution of ammonium poly sulphide possibly containing some $(NH_4)_2S_4$ but believed to be principally $(NH_4)_2S_5$ are added 250 grams of symmetrical di(chloro methyl) ether. A strongly exothermic reaction occurs, the temperature of the mixture rising to 85–90 degrees C. The mixture is then agitated for a period of 3 hours, a plastic composition forming in the meanwhile. This plastic is removed, washed at a temperature of 90 degrees C. with 3,000 cc. of an aqueous 1% NaOH solution and then at 100 degrees C. with an aqueous 2% HCl solution. It is then vacuum dried, upon the completion of which operation it is obtained in a yield of 400 grams in the form of a very rubbery plastic which has only a slight odor and which is not brittle at –10 degrees C. The reaction is probably as follows:

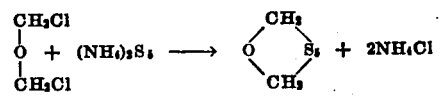

The product may, however, have the formula $(O-CH_2-S_5-CH_2)_n$ rather than that shown.

*Example 5*

In certain cases it will be found desirable to mix with the reaction product of an alkaline poly sulphide and a di(halogenated alkyl) sulphide, oxide, etc., another material which when reacted with an alkaline poly sulphide also gives a plastic composition. Although it is not known what the actual fact is, it is believed that this third material in some cases reacts with the alkaline poly sulphide, but not with the di(halogenated alkyl) sulphide or di(halogenated alkyl) oxide. It may be preferable to add the third material to the alkaline poly sulphide and di(halogenated alkyl) sulphide or di(halogenated alkyl) oxide at the time of their reaction, although it is possible to prepare the two reaction products separately and then mix them together. The advantages of such a reaction reside in the fact that in some cases the plastic obtained by reacting an alkaline poly sulphide with a di(halogenated alkyl) sulphide or oxide is too soft for some uses. Thus, if a material is added which upon reaction with an alkaline poly sulphide gives a plastic which is too stiff for a given use, a proper blending of the two reaction products will give a satisfactory plastic.

An illustration is found in the procedure described below.

To 2,500 grams of a 50% aqueous solution of ammonium tetra sulphide $(NH_4)_2S_4$ and 2,500 grams of ice are added a mixture of 524 grams of di(chlor methyl) sulphide and 240 grams of diglycerol tetra chlor hydrin, the reaction meanwhile being thoroughly agitated. For the reason that the reaction is exothermic, the temperature is kept below 10 degrees C. A plastic material forms at once. The agitation is continued, however, for approximately 8 hours in order to insure completion of the reaction, after which the plastic product is washed and dried in a vacuum. Approximately 1,050 grams of finished plastic are obtained.

It has been suggested that the equations representing the reaction are as follows:

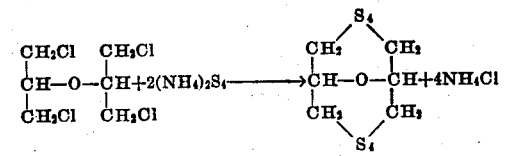

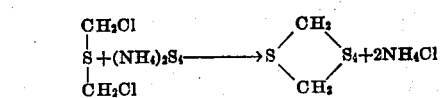

The second of these reaction products may have the formula $(S-CH_2-S_4-CH_2)_n$ rather than that shown. If it is true that the ammonium tetra sulphide reacts with the diglycerol tetra chlor hydrin and di(chloro methyl) sulphide in accordance with the reactions described in the above equations, the proportions of reacting materials should give a reaction product of ammonium tetra sulphide and diglycerol tetra chlor hydrin in the proportion of approximately 70% of the total plastic and a reaction product of ammonium tetra sulphide and di(chloro methyl) sulphide in the proportion of approximately 30%.

The purified product is quite pliable and has an elasticity somewhat similar to that of soft rubber. It is substantially free from chlorine and when employed in vulcanized rubber compositions gives products possessing excellent resistance to solvents such as gasoline and the petroleum hydrocarbons. It is not vulcanizable in itself, but may be employed in almost any proportion in vulcanizable rubber compositions to give, on vulcanization, excellent products.

One illustration of the value of the compositions of this invention is found in the use of the product thus obtained in rubber compositions such as the following:

| | Parts by weight |
|---|---|
| Synthetic plastic | 100.00 |
| Smoked sheet rubber | 10.00 |
| Zinc oxide | 11.00 |
| Stearic acid | 0.30 |
| Mercaptobenzothiazole | 0.10 |
| Sulphur | 0.40 |
| Carbon black | 15.00 |
| Thermatomic carbon black | 15.00 |
| Diphenylguanidine | 0.50 |
| White factice | 20.00 |
| Zinc stearate | 3.00 |

By way of test, a composition of the above formula was cured for 60 minutes at a temperature of 260 degrees F. One sample of the resulting vulcanized stock was immersed in gasoline for a period of 24 hours and at the end of that time was found not to have increased in length or in thickness. After a 48 hours' period of immersion in gasoline, it was found to have increased in length only 0.7%. A control test carried out on a similar composition employing rubber in place of the plastic was found to have "swelled" or increased linearly 26.5% after 24 hours' immersion in gasoline and 28% after 48 hours' immersion.

In another test showing the value of the synthetic plastics of this invention, samples of the above composition, after being vulcanized for 60 minutes at 260 degrees F., were immersed in a freezing salt solution maintained at 0 degrees C. or below. The samples were allowed to remain in the freezing solution until they had reached equilibrium and were then removed and immediately subjected to a sudden impact, such as that obtained by striking them on the edge of a table. Similar tests were carried out for purposes of comparison on an all-rubber composition. The all-rubber composition did not break. Neither did the composition containing the synthetic plastic. Since rubber compositions containing prior art synthetic plastics break easily under such conditions, it is readily seen that the plastics of this invention are valuable for use where toughness at relatively low temperatures is required.

The ultimate tensile strength and the maximum elongation of the stock resulting from the vulcanization of the composition given above containing the mixed plastic prepared as described herein were, respectively, 15.0 kgs./cm$^2$ and 130%. The ultimate tensile strength and maximum elongation for the all-rubber composition which was tested in comparison with the synthetic plastic stock were 13.5 kgs.cm$^2$ and 487%.

*Example 6*

Further illustrative of the invention, 34 grams of dichlor hydrin and 30 grams of di(chloro methyl) ether are added to 300 grams of an aqueous 50% solution of ammonium tetra sulphide. The mixture is agitated for several hours, after which the plastic which forms is washed with a 2% aqueous sodium hydroxide solution and then with water. An excellent product is obtained. The reactions involved are not as yet understood but it is believed that the dichlor hydrin and dichlor methyl ether react, following which the reaction product so obtained further reacts with the ammonium poly sulphide to form a plastic.

It will be understood that many variations may be made in the process of preparing the improved synthetic plastics of this invention. Thus, if desired, the reaction product of the alkaline poly sulphide and di(halogenated alkyl) sulphide or di(halogenated alkyl) oxide may be used as such or mixed with a reaction product of an alkaline poly sulphide and another material which reacts to give a plastic composition. Alternatively, the alkaline poly sulphide, the di(halogenated alkyl) sulphide or di(halogenated alkyl) oxide and the third material, such as dichlor hydrin or diglycerol tetra chlor hydrin, may be reacted simultaneously. In certain cases, it is possible that a single reaction occurs involving all three reacting materials. In others, it is probable that the alkaline poly sulphide reacts separately with each of the other two materials, the resulting reaction products being contained as a mere admixture in the finished plastic.

In place of the di(halogenated alkyl) sulphide and di(halogenated alkyl) oxides employed in the illustrative examples, di(beta chlor ethyl) telluride, di(chlor methyl) selenide, di(chlor methyl) telluride, symmetrical di(beta chlor ethyl) sulphide and symmetrical di(beta chlor ethyl) selenide may be employed with excellent results. Other chlor hydrins which may be employed are diglycerol dichlor hydrin, triglycerol hexa chlor hydrin, triglycerol penta chlor hydrin, tetra glycerol tetra chlor hydrin, diglycerol tetra brom hydrin and diglycerol tetra iodo hydrin. With some of these compositions, the exact constitution of the reaction product has not been determined, but because of the proportion of materials reacted is believed akin to those described herein.

It will be understood that the synthetic plastics of this invention may be employed in various vulcanized rubber compositions other than that specifically described herein and that these plastics may be suitably mixed with various other substances such as metallic oxides, carbon black, mineral fillers, such as asbestine and whiting, and many other of the well known rubber compounding ingredients. By the term "unvulcanized rubber", it is intended to include not only ordinary new or coagulated rubber but also reclaimed rubber, balata, gutta percha and synthetic rubber. It will also be understood that the synthetic plastics of this invention may be employed in admixture with other synthetic plastics. They may also be used in water emulsions with latex by first dissolving them in a suitable solvent such as cyclohexylamine.

It is intended that the patent shall cover, by suitable expression in the appended claims, whatever features of patentable novelty reside in the invention.

What I claim is:

1. The reaction product of an alkaline poly sulphide, a poly glycerol halogen hydrin and a symmetrical di(halogenated alkyl) compound of a non-metallic element of group VI of Mendelejeff's periodic system.

2. A synthetic plastic composition comprising a reaction product of an alkaline poly sulphide and a poly glycerol halogen hydrin and the reaction product of an alkaline poly sulphide and a symmetrical di(halogenated alkyl) suphide.

3. A plastic composition comprising the reaction product of an alkaline poly sulphide, a poly glycerol poly halogenated hydrin and a symmetrical di(chloro alkyl) sulphide.

4. A reaction product of an alkaline poly sulphide, a poly glycerol poly chlor hydrin and symmetrical di(chloro methyl) sulphide.

5. A plastic composition comprising the reaction product of an alkaline poly sulphide, diglycerol tetra chlor hydrin and di(chloro methyl) sulphide.

6. A plastic composition comprising a mixture of approximately 70% of the reaction product of ammonium tetra sulphide and diglycerol tetra chlor hydrin and approximately 30% of the reaction product of ammonium tetra sulphide and di(chloro methyl) sulphide.

7. A plastic composition comprising a mixture of the reaction product of an alkaline poly sulphide and a poly glycerol poly halogenated hydrin and a reaction product of an alkaline poly sulphide and a di(chloro methyl) ether.

8. The method of producing a plastic which comprises reacting an alkaline poly sulphide with a diglycerol tetra halogenated hydrin and a di(chloro methyl) ether.

9. The method of preparing a synthetic plastic which comprises admixing an aqueous solution of an alkaline poly sulphide with diglycerol tetra chlor hydrin and di(chloro methyl) sulphide at a temperature of approximately 10 degrees C., meanwhile agitating the mixture, continuing the agitation for several hours, and removing substantially all alkaline compounds to form a substantially halogen-free product.

10. A vulcanizable composition comprising unvulcanized rubber, sulphur and a plastic comprising the mixture of a reaction product of an alkaline poly sulphide and diglycerol tetra chlor hydrin and the reaction product of an alkaline poly sulphide and di(chloro methyl) sulphide.

11. A vulcanizable composition comprising the reaction product of unvulcanized rubber, sulphur and a plastic comprising a mixture of approximately 70% of the reaction product of ammonium tetra sulphide and diglycerol tetra chlor hydrin and approximately 30% of the reaction product of ammonium tetra sulphide and di(chloro methyl) sulphide.

12. A vulcanizable composition comprising unvulcanized rubber, sulphur and the reaction product of an alkaline poly sulphide, a poly glycerol halogenated hydrin and a di(halogenated alkyl) ether.

13. An improved rubber composition which has been vulcanized in the presence of the reaction product of an alkaline poly sulphide, a poly glycrol halogen hydrin and a symmetrical di(halogenated alkyl) compound of a non-metallic element of group VI of Mendelejeff's periodic system.

WILLIAM P. ter HORST.